United States Patent [19]

Kushima et al.

[11] Patent Number: 4,767,918

[45] Date of Patent: Aug. 30, 1988

[54] READING AND WRITING APPARATUS FOR PORTABLE RECORDING MEDIUM

[75] Inventors: Hidekiyo Kushima, Kanagawa; Tsutomu Tanaka, Tokyo, both of Japan

[73] Assignee: Kabushiki Kaisha Toshiba, Kawasaki, Japan

[21] Appl. No.: 14,017

[22] Filed: Feb. 12, 1987

[30] Foreign Application Priority Data

Mar. 31, 1986 [JP] Japan .................................. 61-71064

[51] Int. Cl.$^4$ ............................................. G06K 7/06
[52] U.S. Cl. .................... 235/441; 235/436; 235/492
[58] Field of Search ...................... 235/441, 492, 436

[56] References Cited

U.S. PATENT DOCUMENTS 4,004,133  1/1977  Hannan et al. ...................... 235/441
4,373,158  2/1983  Orloff ............................. 235/441 X
4,621,190  11/1986 Saito et al. ......................... 235/492
4,720,626  1/1988  Nishikawa et al. .............. 235/492 X Primary Examiner—David L. Trafton
Attorney, Agent, or Firm—Foley & Lardner, Schwartz, Jeffery, Schwaab, Mack, Blumenthal & Evans

[57] ABSTRACT

In an IC card information reading and writing apparatus, a clock oscillator (4.9 MHz) is incorporated in the apparatus. Since the high-frequency clock is not passed through a cable connected between the apparatus and an external control unit, but supplied from the clock oscillator to the IC card via a short distance, the external control unit can stably control the IC card through the long cable without generating crosstalk or reflection. The clock signal is selectively supplied to the IC card via an AND gate in response to a clock-enable signal from the external control unit or a binary logic signal supply voltage for the reading and writing apparatus.

9 Claims, 9 Drawing Sheets

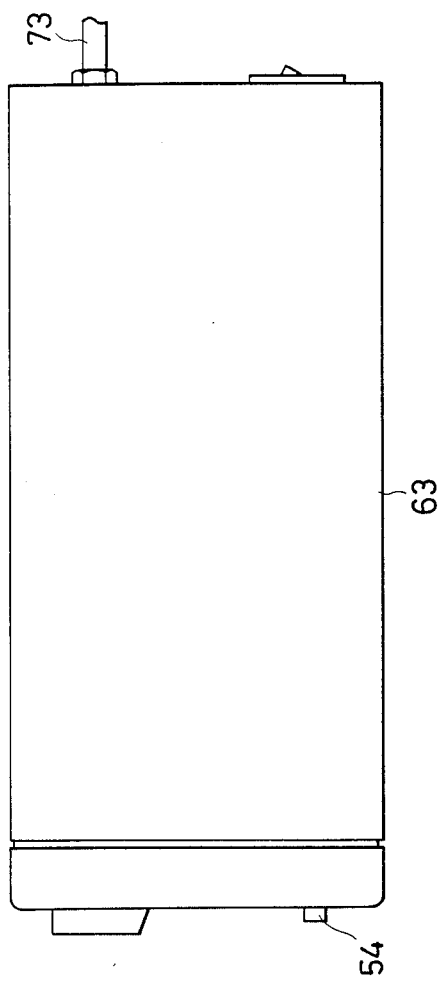
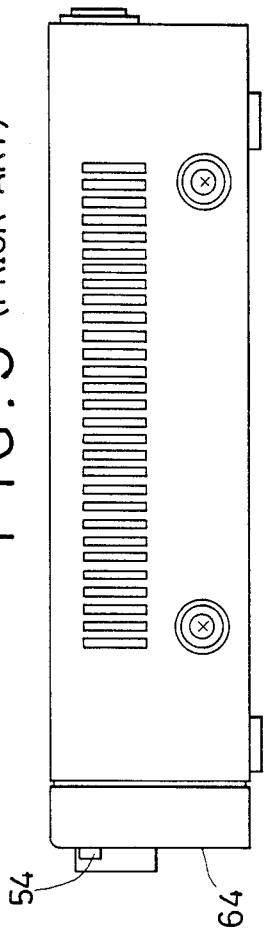
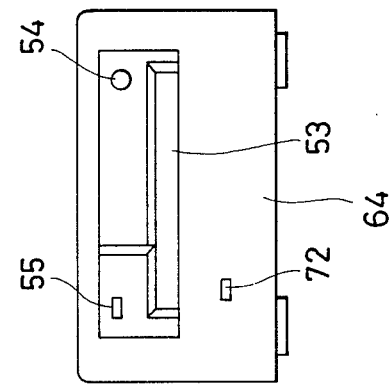
FIG. 4 (PRIOR ART)
FIG. 5 (PRIOR ART)
FIG. 6 (PRIOR ART)

READING AND WRITING APPARATUS FOR PORTABLE RECORDING MEDIUM

BACKGROUND OF THE INVENTION

1. Field of the Invention

The present invention relates to a data reading and writing apparatus for connecting a portable recording medium (referred to as an IC card) to an external control unit so that the IC card can be controlled by the external control unit.

2. Description of the Prior Art

In an IC card, a semiconductor chip including a microcomputer and a memory unit (recording medium) are buried in a pocket-sized plastic card base. Further, 8 external terminals including a power supply terminal to the microcomputer and the memory unit are usually arranged on the surface of the card base.

In order to read or write information in or from the IC card, an IC card reading and writing apparatus is necessary. In one example of the prior art reading and writing apparatus, since no control circuit is incorporated in the apparatus, although the cost is low, there exists a problem in that when a high frequency clock signal is transmitted through a cable connected between the apparatus and an external control unit, signal crosstalk or reflection is produced in the cable, so that it is impossible to reliably control the IC card by the external control unit through a long cable connected between the two.

Here, crosstalk is a phenomenon such that when a high-frequency signal is passed through a first wire, a voltage is induced in a second wire arranged in parallel and adjacent to the first wire. Further, reflection means that since stray capacity and residual inductance exist in a wire, voltage vibration inevitably occurs between two active elements and a ringing voltage is reflected when no matching is made between two elements.

Further, in the other example of the prior art reading and writing apparatus, since a microprocessor is incorporated in the apparatus, although the problem involved in the first example apparatus can be solved, there exists another problem in that the cost is high and the external dimensions are relatively large.

The system configuration of the two typical examples of prior art IC card reading and writing apparatus will be described in further detail hereinafter with reference to the attached drawings under DETAILED DESCRIPTION OF THE PREFERRED EMBODIMENT.

SUMMARY OF THE INVENTION

With these problems in mind, therefore, it is the primary object of the present invention to provide a data reading and writing apparatus for portable recording mediums provided with a reliable controllability for the mediums without increasing the external dimensions and the cost.

To achieve the above-mentioned object, the data reading and writing apparatus for a portable recording medium, having a recording medium loading section and a contact section to connect external terminals of the loaded recording medium to an external control unit for controlling the recording medium, according to the present invention comprises: (a) clock oscillator means for generating an operation clock to be supplied to the portable recording medium through the contact section; and (b) logic circuit means responsive to a binary logic signal supplied from the external control unit, for selectively supplying the operation clock from said clock oscillator means to the recording medium.

In the apparatus according to the present invention, when a portable recording medium is loaded in the medium loading section thereof, a driving mechanism is actuated so that the contact section is brought into contact with the external terminals of the medium. In addition, a detection signal indicative of the loading of the medium is sensed by a medium sensor and then applied to the external control unit.

In response to this detection signal, the external control unit supplies binary logic signals to the reading and writing apparatus to control the logic circuit means, so that an operation clock is supplied from the clock oscillator means to the medium through the contact section. Simultaneously, control signals such as power supply voltage, reset signal, etc. are supplied to the portable recording medium through the contact section to activate the medium. As a result, data is transferred between the external control unit and the recording medium. As described above, the high-frequency operation clock signal is not supplied from the external control unit to the portable recording medium via the reading and recording apparatus, but generated from the clock oscillator incorporated with the apparatus and then supplied from the oscillator to the portable recording medium under the control of the external control unit. Therefore, it is possible to stably control the recording medium by the external control unit via a long cable without producing crosstalk or reflection through the cable.

The clock oscillator is activated by a supply voltage for the card reading and writing apparatus or a binary logic signal supply voltage for the IC card. The logic circuit is preferably an AND gate responsive to a clock-enable binary logic signal from the external unit or a binary logic signal supply voltage for the portable recording medium.

BRIEF DESCRIPTION OF THE DRAWINGS

The features and advantages of the data reading and writing apparatus according to the present invention will be more clearly appreciated from the following description of the preferred embodiment taken in conjunction with the accompanying drawings in which:

FIG. 1 is a plan view showing a casing body thereof;

FIG. 2 is a front view showing the front panel of the casing body shown in FIG. 1;

FIG. 3 is a wiring diagram of a circuit incorporated in the apparatus;

FIGS. 4 to 7 show a second example of prior art reading and writing apparatus;

FIG. 4 is a plan view of a casing body thereof;

FIG. 5 is a side view showing the casing body thereof;

FIG. 6 is a front view showing the front panel of the casing body thereof;

FIG. 7 is a block diagram of a circuit incorporated in the apparatus;

FIGS. 8 to 13 show embodiments of the reading and writing apparaus for portable recording mediums according to the present invention;

FIG. 9 is a plan view showing a casing body thereof;

FIG. 10 is a front view showing a front panel of the casing body thereof;

FIG. 11 is a model view showing a cable and a connector disposed between the reading and writing apparatus and an external control unit;

FIG. 12 is a block diagram showing an interface circuit disposed between the external control unit and the apparatus; and FIG. 13 is a timing chart of various signals for assistance is explaining the operation of the apparatus.

DETAILED DESCRIPTION OF THE PREFERRED EMBODIMENT

To facilitate undestanding of the present invention, a reference will be made to prior-art IC card information reading and writing apparatus, with reference to the attached drawings.

Figure 1:
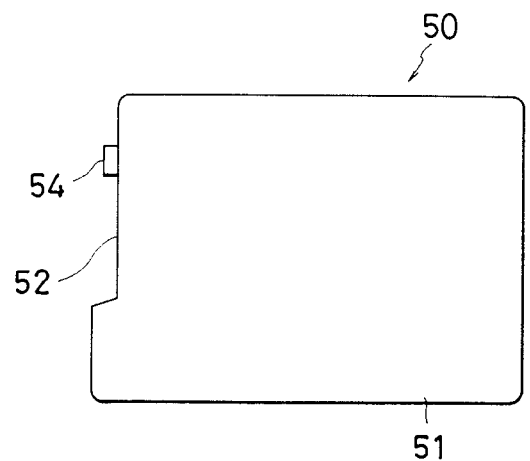
FIGS. 1 to 3 show a first example of prior art reading and writing apparatus.
Figure 2:
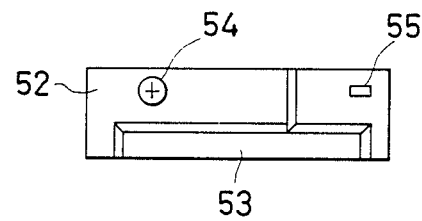
Figure 3:
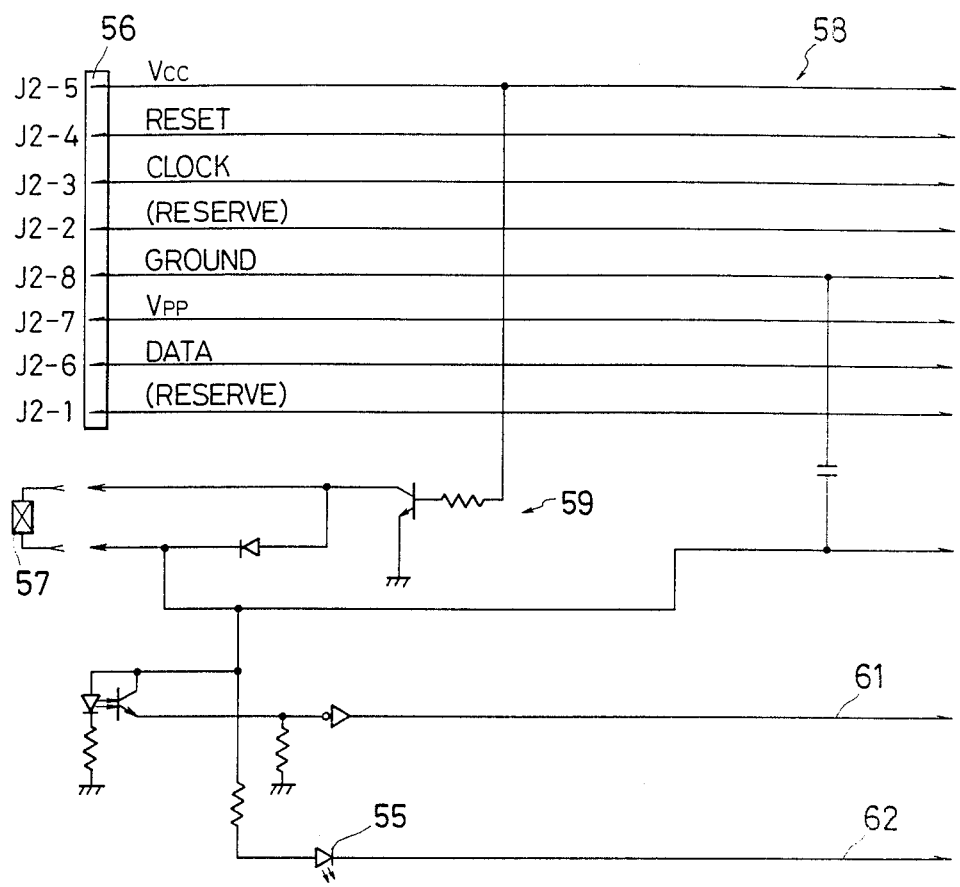

FIGS. 1 to 3 show a first example 50 of the prior-art apparatus, in which FIG. 1 is a plan view showing a casing body; FIG. 2 is a front view of the casing body; and FIG. 3 is a circuit diagram thereof. In FIG. 2, there are provided an IC card insertion slot 53, an eject button 54, and operation pilot lamp 55 on a front panel 52 of the casing body 51. In FIG. 3, the numeral 56 denotes a contact section with which the external terminals of the IC card are brough into contact. This contact section 56 is mounted on a driving mechanism provided with a solenoid 57. When this solenoid 57 is energized, the contact section 56 is brought into contact with the external terminals of the inserted IC card.

An operation power supply Vcc is supplied to a contact J2-5 of the contact section 56; a reset signal is supplied to a contact J2-4; a clock signal is supplied to a contact J2-3; a data is inputted or outputted to or from a contact J2-6; a write power supply Vpp is supplied to a contact J2-7; and a contact J2-8 is a common ground contact for a supply voltage and a signal. Further, contacts J2-1 and J2-2 are reserved.

The above contacts J2-3 to J2-8 of the contact section 56 are all connected to an external control unit (not shown) through cables 58.

When an IC card is inserted into the card insertion slot 53 and therefore the driving mechanism is actuated to supply an operating power supply Vcc to the IC card, the inserted card is loaded and locked by a locking mechanism (not shown) and an electric circuit section 59 incorporated in the reading and writing apparatus 50 to energize the locking mechanism, so that the inserted card is prevented from being ejected from the apparatus. Further, in FIG. 3, the numeral 61 denotes a card detection signal wire; the numeral 62 denotes a pilot signal wire leading to an operation pilot lamp 55, and these two wires 61 and 62 are also connected to an external control unit.

When an IC card is inserted through the card insertion slot 53 and therefore the driving mechanism is 65 actuated to bring the contact section 56 into contact with the external terminals of the IC card, the IC card is connected to the external control unit. Therefore, an operation power supply Vcc, control signals (such as a reset signal), bidirectional input and output signals, a clock signal, etc. are all transferred between the IC card and the external control unit. In this case, a high-frequency clock signal of 4.9 MHz is supplied to the IC card via the cable 58.

In the first prior art apparatus as described above, since almost no control circuits are incorporated in the information reading and writing apparatus 50 itself, there exists such an advantage that the apparatus is less costly. However, there exists a problem such that crosstalk or reflection is readily produced through the cables 58, because the signals transmitted through the cables, in particular, the clock signal is high in frequency, so that it is difficult to reliably control the IC card by the external control unit where the cable 58 is long.

Figure 7:
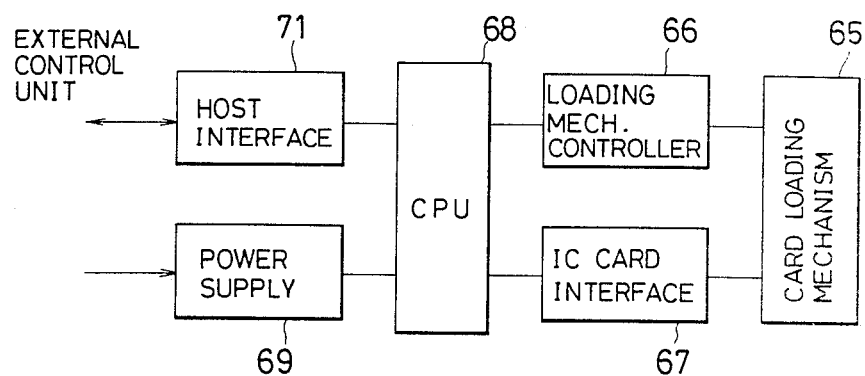

FIGS. 4 to 7 show a second example of the prior art apparatus 60, in which the afore-mentioned problem involved in the first prior-art apparatus can be improved. FIG. 4 is a plan view showing a casing body 63 of the reading and writing apparatus 60, FIG. 5 is a side view showing the casing body; FIG. 6 is a front view of a front panel; and FIG. 7 is a block diagram showing the circuit configuration.

In the second prior art apparatus 60, the mechanisms and circuits corresponding to those as described in the first prior art apparatus are almost all included in addition to circuits as explained below. In FIG. 7, the numeral 65 denotes an IC card loading mechanism in which a contact section as shown in FIG. 3 is included. The numeral 66 denotes a card loading mechanism control circuit; the numeral 67 denotes an IC card interface circuit; the numeral 68 denotes a microprocessor (CPU); the numeral 69 denotes a power supply circuit, the numeral 71 denotes a host interface circuit intervening between the microprocessor 68 and external control unit (not shown). Further, on a front panel 64 there is disposed an operation pilot lamp 72 for indicating the operation of the power supply circuit 69.

The reading and writing apparatus 60 is connected to the external control unit via a cable 73 shown in FIG. 4. Information communications are made between the apparatus 60 and the external control unit on the basis of the first protocol different from the second protocol determined between the apparatus 60 and the IC card, in order to control the driving mechanism of the reading and writing apparatus 60 and the IC card from the external control unit. The control signals, bidirectional input and output data, the clock signal, and the power supply voltage all communicating between the external control unit and the IC card are processed and outputted by the microprocessor 68 incorporated in the reading and writing apparatus 60.

In the second prior art example, since the distance between the control unit (the microprocessor 68) and the contact section of the card loading mechanism 65 is fairly short, no problems as described in the first prior art example will arise and therefore no additional cables are required other than a serial data line for transferring output and input signals and a common ground line. In the second prior art apparatus, however, since a microprocessor 68 is incorporated, there still exists a problem such that the apparatus is high in cost and large in external dimensions and therefore it is sometimes impossible to incorporate the apparatus in an operation section of a terminal device.

On the other hand, the external control unit for controlling the terminal devices uses a powerful microprocessor such as Z80 Model (Zilog Corp.) or 8086 Model (Intel Corp.), for instance. Therefore, it is unnecessary to provide a costly microprocessor for the reading and writing apparatus when a buffer circuit including several ICs, transistors, capacitors, diodes, etc. of a relatively low cost circuit configuration is incorporated; that is, it is possible to directly control the IC card in accordance with programs of several killobytes. Accordingly, there exists a need of realization of an IC card information reading and writing apparatus which can directly control an IC card while solving the problem involved in the first prior art example when a high-frequency clock signal is transmitted through the cable.

In view of the above description, reference is now made to embodiments of the reading and writing apparatus for a portable recording medium according to the present invention, with reference to FIGS. 8 to 13.

Figure 9:
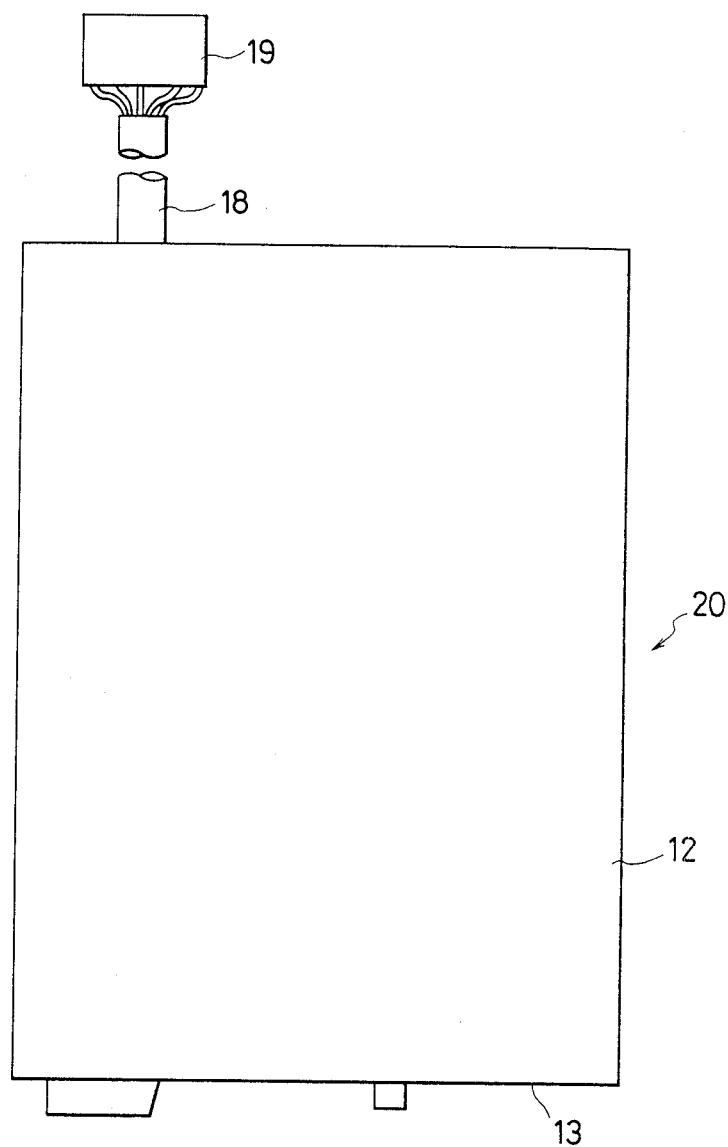
Figure 10:
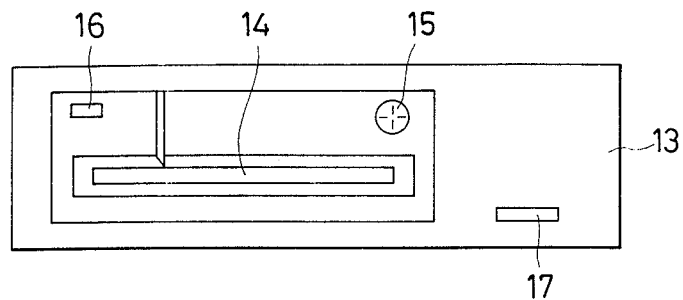

In FIG. 9, the reference numeral 12 denotes a casing body of the reading and writing apparatus 20. On a front panel 13 of the casing body 12 there are arranged a card insertion slot (medium loading section) 14, an eject button 15, an operation pilot lamp 16 and a power supply pilot lamp 17, as shown in FIG. 10. The power supply pilot lamp 17 comes on whenever a supply voltage is being applied to the reading and writing apparatus 20.

As shown in FIG. 9, a cable 18 connected to an external control unit is provided for the apparatus at the rear panel of the casing body 12. A connector 19 is attached to the free end of the cable 18 so as to be connectable to the extenal control unit.

Figure 8A:
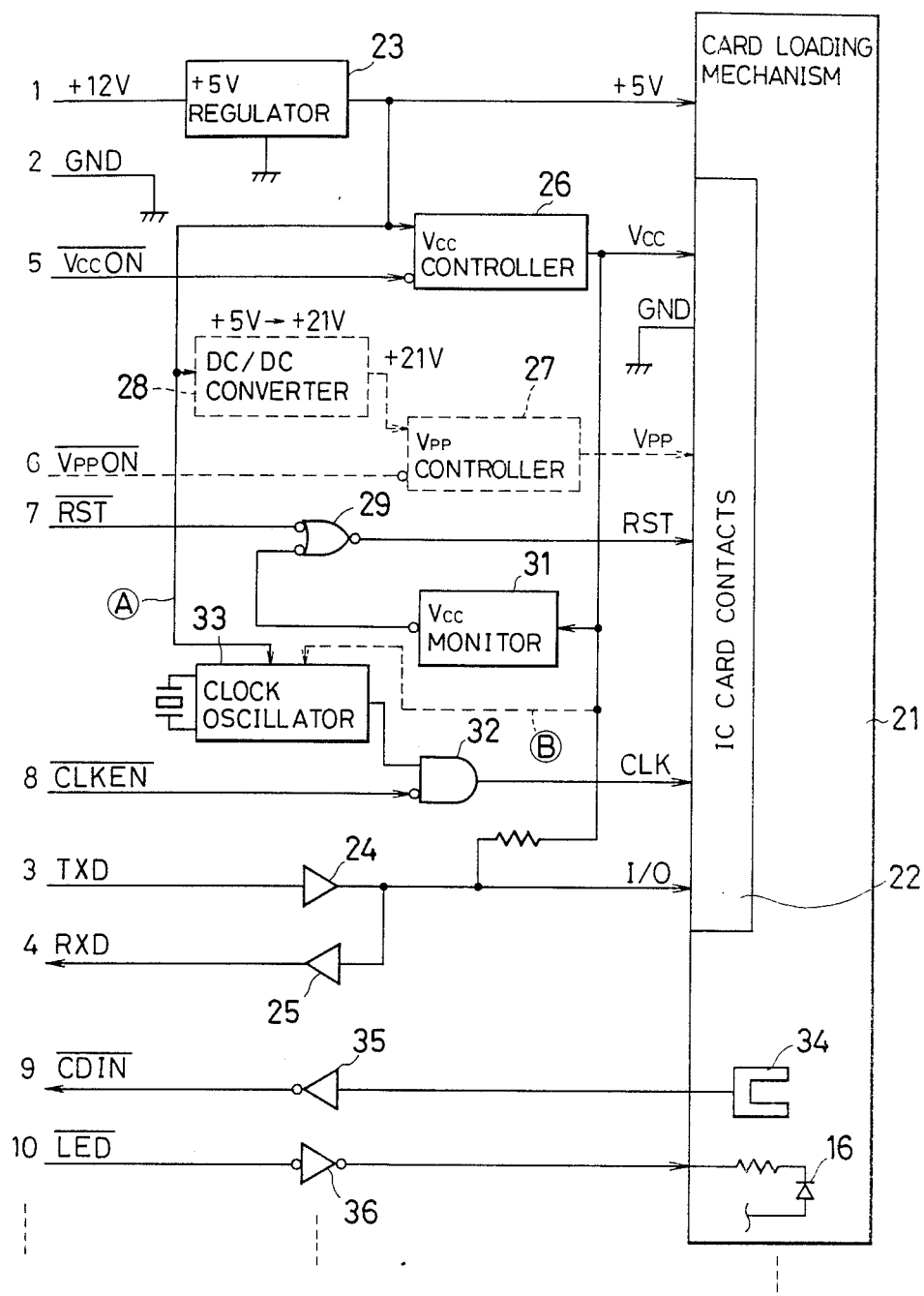
FIGS. 8A is a block diagram showing the circuit incorporated in the apparatus, in which first and second embodiments are shown.

In FIG. 8A, the numeral 21 denotes a card loading mechanism, in which an IC card contact section 22 is disposed.

The contact section 22 is energized by a solenoid installed in a card loading mechanism so as to be brought into contact with the external terminals of an IC card when the IC card is inserted into a card insertion slot 14.

Figure 11:
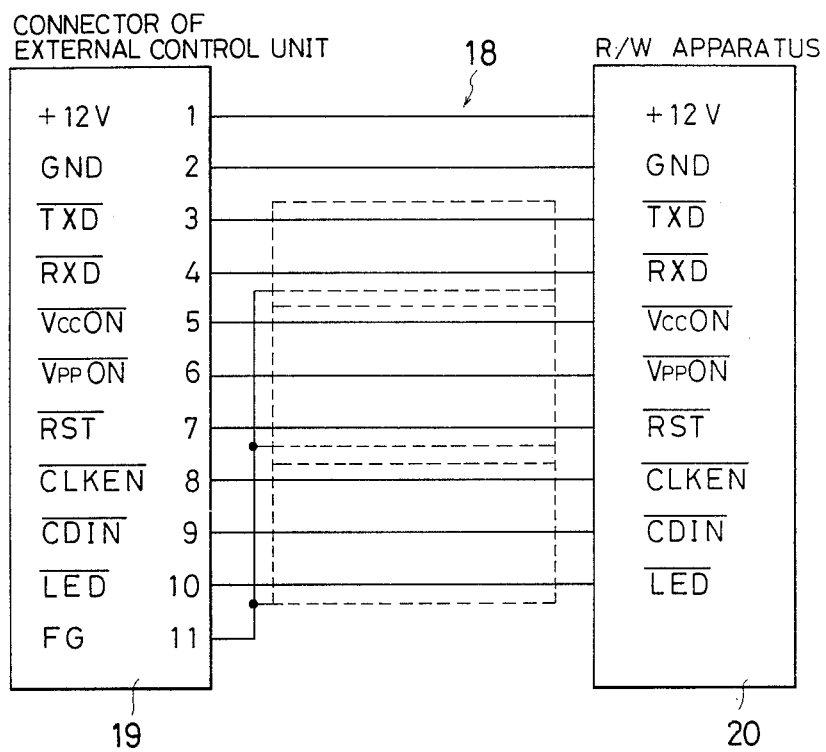

With reference to FIGS. 8A and 11, the internal functions of the casing body 12 will be described in terms of plural signal wires bundled by a cable 18. Here, the description will be made by designating each signal wire by each pin number of the connector 19 of the external control unit.

A supply voltage of +12 V, for instance is supplied from an external control unit through a signal wire No. 1 to which a voltage regulator 23 is connected. The regulator 23 generates a regulated voltage of +5 V, for instance, on the basis of a supply voltage of +12 V. This regulated +5 V voltage is supplied to a reading and writing apparatus 20 as a supply voltage.

A signal wire No. 2 is used as a common ground for the supply voltage and all the signals. A signal wire No. 3 is a data line for transmitting data from the external control unit to an IC card. This signal wire No. 3 is connected to the contact section 22 via a buffer 24. A signal wire No. 4 is a data line for transmitting data from the IC card to the external control unit. This signal wire No. 4 is connected from the contact section 22 to the connector 19 via a buffer 25. These two signal wires No. 3 and No. 4 are wire-ORed by the contact section 22 to allow these wires to serve as a bidirecticnal data signal line.

A signal wire No. 5 is a control signal line for controllably connecting or disconnecting the operation power supply Vcc to or from an IC card, to which a binary logic signal $\overline{\text{Vcc ON}}$ is supplied from the external control unit to turn on or off the supply voltage. This signal wire No. 5 is connected to the contact section 22 via a Vcc control circuit 26 connected to an output signal wire of the regulator 23. When the binary logic signal $\overline{\text{Vcc ON}}$ is at a low ("L") level, an operation supply voltage Vcc is supplied from the Vcc control circuit 26 to an IC card. The Vcc control circuit 26 serves as an overcurrent prevention circuit.

A signal wire No. 6 is a control signal line for controllably connecting or disconnecting a write enabling voltage Vpp to or from an IC card, to which a binary logic signal $\overline{\text{Vpp ON}}$ is supplied from the external control unit. This signal wire No. 6 is connected to the contact section 22 via a Vpp control circuit 27 to which an output signal wire of the regulator 23 is connected via a DC—DC converter 28. An output voltage of +5 V from the regulator 23 is boosted to +21 V, for instance, through the DC—DC converter 28 so as to be applicable as a write enabling voltage Vpp. The write enabling voltage Vpp is applied from the Vpp control circuit 27 to an IC card. Further, the write enabling voltage Vpp of the above embodiment is effective when the memory of the IC card is an EPROM (erasable programmable ROM).

A signal wire No. 7 is a control signal line for controllably connecting or disconnecting a reset signal to or from the IC card, to which a binary logic signal $\overline{\text{RST}}$ is supplied from the external control unit. This signal wire No. 7 is connected to the contact section 22 via an AND gate 29. Further, an output signal wire of the Vcc control circuit 26 is connected to an input terminal of the AND gate 29 via a Vcc monitoring circuit 31 for monitoring the voltage level Vcc. When the binary logic signal $\overline{\text{RST}}$ is at an "L" level and the operation voltage Vcc is being outputted from the Vcc control circuit 26, a reset signal is given to the IC card through the AND gate 29.

A signal line No. 8 is a control signal line for supplying or interrupting a clock signal to or from the IC card, to which a binary logic signal $\overline{\text{CLKEN}}$ is supplied from the external control unit. This signal wire No. 8 is connected to one input terminal of a two-input AND gate 32. A clock oscillator 3 is connected to the other input terminal of the AND gate 32. The clock oscillator 33 outputs an IC card activating clock with a frequency about 4.9 MHz. This clock signal is supplied to the IC card when the AND gate 32 is activated open in response to an "L"-level binary logic signal $\overline{\text{CLKEN}}$.

A signal wire No. 9 is a signal line for outputting an IC card detection signal, to which a card loading detecting sensor 34 disposed in the card loading mechanism 21 is connected via a buffer 35. When an IC card is inserted into the card insertion slot 14, a card detection signal $\overline{\text{CDIN}}$ of an "L" level is outputted to the signal wire No. 9. In response to this card detection signal $\overline{\text{CDIN}}$, the external control unit detects that an IC card is loaded in the reading and writing apparatus 20.

A signal wire No. 10 is a control signal wire for an operation pilot lamp 16, to which an ON-and-OFF control signal $\overline{\text{LED}}$ is supplied from the external control unit. This signal line is connected to an operation pilot lamp 16 via a buffer 36. The pilot lamp 16 comes on when the ON-and-OFF control signal $\overline{\text{LED}}$ is at an "L" level.

A signal wire 11 (shown in FIG. 11) is a shielded ground line connected to a casing ground level.

Figure 12:
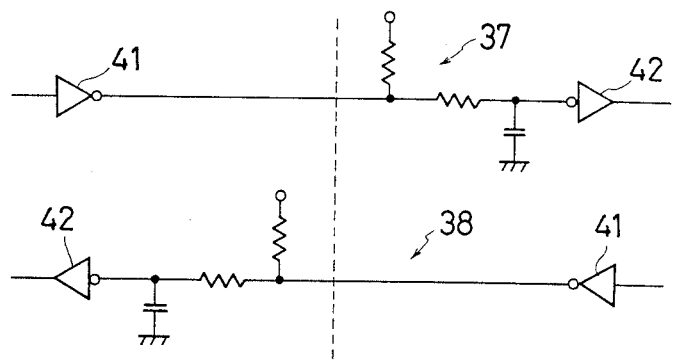

FIG. 12 shows interface circuits disposed between the external control unit (ECP) and the reading and writing apparatus (R/W). In FIG. 12, the reference numeral 37 denotes an interface for transmitting signals from the external control unit to the reading and writing apparatus as in the signal wire No. 3, for instance. On the other hand, the numeral 38 denotes an interface for transmitting signals from the reading and writing apparatus to the external control unit as in the signal wire No. 4. These two interfaces 37 and 38 are composed of buffers 41 and 42 as usual.

Figure 8B:
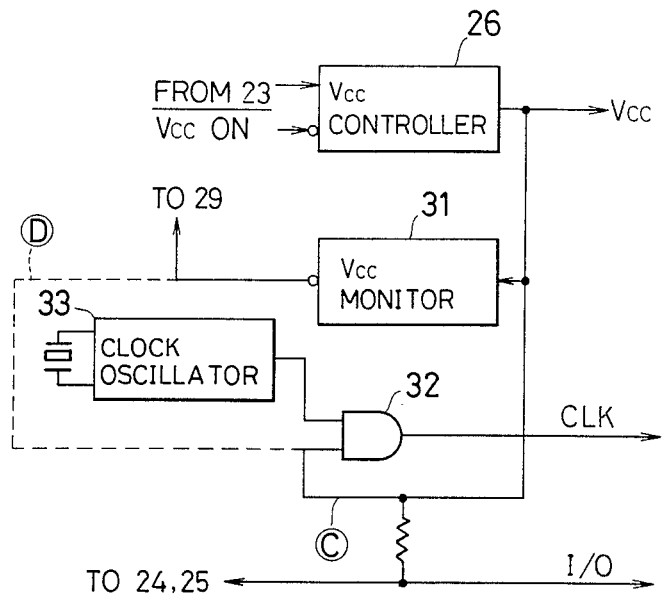
FIG. 8B is a block diagram showing the clock oscillator related circuit, by which third and fourth embodiments are shown.
Figure 8C:
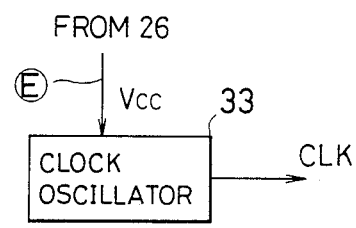
FIG. 8C is a block diagram showing only the clock oscillator, by which a fifth embodiment is shown.

With reference to FIGS. 8A, 8B and 8C, the clock oscillator 33 and the AND gate 32 according to the present invention will be described in further detail.

In the first embodiment shown in FIG. 8A, the oscillator 33 is always activated by the supply voltage +5 supplied from the regulator 23 (designated by solid lines A) and the generated clock signal is supplied to the IC card via the AND gate 32 in response to the clock enable signal $\overline{\text{CLKEN}}$ supplied from the external control unit.

In the second embodiment shown in FIG. 8A, the oscillator 33 is activated by the binary logic signal supply voltage Vcc supplied from the Vcc controller 26 (designated by dashed lines B) and the generated clock signal is supplied to the IC card via the AND gate 32 in response to the clock enable signal $\overline{\text{CLKEN}}$ supplied from the external control unit. In this second embodiment, since the clock oscillator is activated intermittently, it is possible to economize the power consumption particularly when the external control unit is of small-sized portable type.

In the first and second embodiments, the AND gate 32 is activated open in response to the clock-enable signal $\overline{\text{CLKEN}}$ supplied from the external control unit. However, it is also possible to open the AND gate 32 in response to a binary logic signal generated within the reading and writing apparatus itself.

In the third embodiment shown in FIG. 8B, the AND gate 32 is directly activated open in response to the binary logic signal supply voltage Vcc for the IC card (designated by the solid lines C). Further, in the fourth embodiment shown in FIG. 8B, the AND gate 32 is activated open in response to a binary logic signal supply voltage Vcc for the IC card supplied via the Vcc monitor 31 (designated by the dashed lines D.)

Furthermore, FIG. 8C shows the fifth embodiment of the present invention, in which the clock oscillator is activated in response to the binary logic signal supply voltage Vcc and the generated clock is directly supplied to the IC card as it is.

The operation of the apparatus will be described with reference to a timing chart shown in FIG. 13. When an IC card is inserted into the card insertion slot 14 and therefore loaded at a predetermined position by the card loading mechanism 21, the contact section 22 is brought into contact with the external terminals of the IC card by means of the driving mechanism. Simultaneously, the loading of the card is detected by the card loading detection sensor 34, so that a card detection signal $\overline{\text{CDIN}}$ is supplied to the external control unit through the signal wire No. 9 (FIG. 13a).

Figure 13:
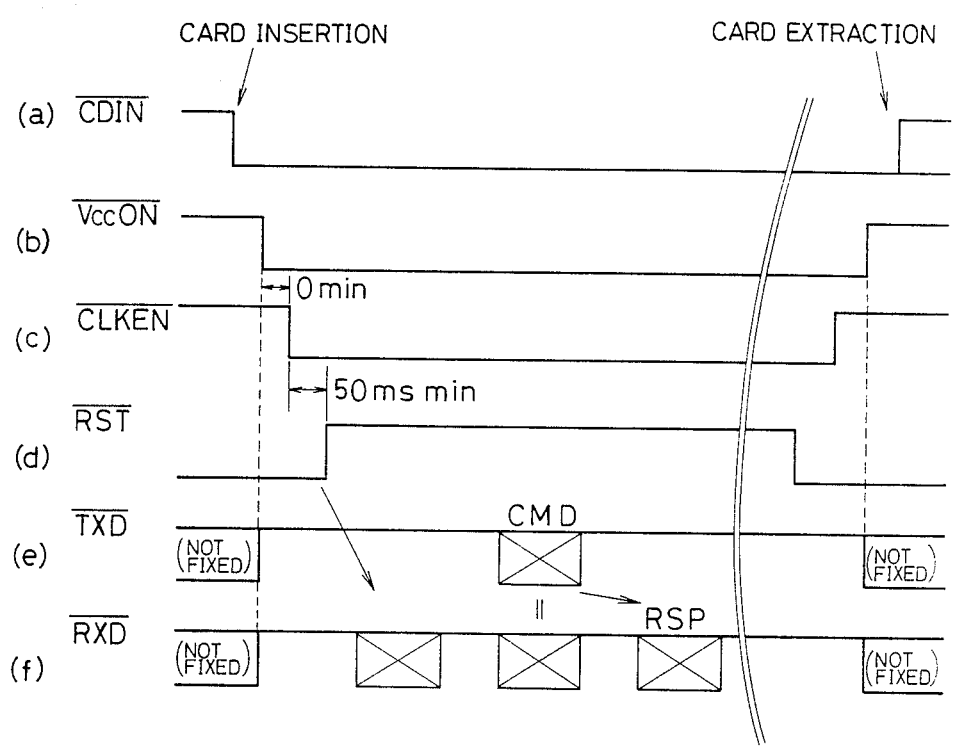

In response to the card detection signal $\overline{\text{CDIN}}$, the external control unit sends the binary logic signals $\overline{\text{Vcc ON}}$, $\overline{\text{CLKEN}}$ and $\overline{\text{RST}}$ in sequence to the reading and writing apparatus 20 (FIG. 13 b, c and d).

In response to the binary logic signal $\overline{\text{Vcc ON}}$, the Vcc controller 26 is activated to supply an operation supply voltage Vcc to the IC card. In response to the binary logic signal $\overline{\text{CLKEN}}$, the AND gate 32 is activated open to supply the clock signal of about 4.9 MHz from the clock oscillator 33 to the IC card. Further, the Vcc voltage is supplied from the Vcc control circuit 26 to the AND gate 29 via the Vcc monitor 31, and the binary logic signal $\overline{\text{RST}}$ and the output from the Vcc monitoring circuit 29 are both ANDed by the AND gate 29 to supply a reset signal $\overline{\text{RST}}$ to the IC card.

Under these conditions, the IC card is initialized, so that data is transferred between the external control unit and the IC card through the data lines No. 3 and No. 4 (FIG. 13 e and f). If the signal is transmitted or received through the data lines No. 3 and No. 4 at a speed of 9600 bps, for instance, 1 bit interval is 1/9600 sec (if the data are repeated on the basis of bit "1" and bit "0", this 1 bit interval corresponds to a period of 4800 Hz).

In the above-mentioned reading and writing apparatus 20, data are transferred between the external control unit and the IC card. In these data transmission and reception operation, since the clock oscillator 33 is disposed in the apparatus 20 so as to reduce the distance between the high frequency clock oscillator 33 and the IC card and further only the binary logic signals which control the logic circuits on the basis of the change in signal level are passed through the cable connected between the external control unit and the apparatus 20, it is possible to reliably control the IC card without producing crosstalk or reflection through the signal wires.

According to the present invention, the clock oscillator for activating the operation of the portable recording medium and the logic circuits for controlling the clock oscillator are disposed in the reading and writing apparatus, and further the logic circuits are controlled in response to the binary logic signals supplied from the external control unit, in order to supply the operation clock generated from the clock oscillator to the portable recording medium. Accordingly, since the distance between the clock oscillator and the portable recording medium through which a high frequency clock signal is passed can be determined short and additionally only the binary logic signals are passed through the cable connected between the external control unit and the apparatus, even if the cable length is relatively long, the IC card can reliably be controlled without producing crosstalk or reflection. Further, since it is unnecessary to provide a microprocessor for the reading and writing apparatus, there exist various advantages such that the reading and writing apparatus is small in size, low in cost and easy in assembling the apparatus with a terminal device.

What is claimed is:

1. A reading and writing apparatus for a portable recording medium, having a recording medium loading section and a contact section to connect external terminals of the loaded recording medium to an external control unit for controlling the recording medium, which comprises:
    (a) clock oscillator means for generating an operation clock to be supplied to the portable recording medium through the contact section; and
    (b) logic circuit means responsive to a binary logic signal supplied from the external control unit, for selectively supplying the operation clock from said clock oscillator means to the recording medium.

2. The reading and writing apparatus as set forth in claim 1, wherein said clock oscillator means is activated in response to a supply voltage for the reading and writing apparatus.

3. The reading and writing apparatus as set forth in claim 1, whrein said clock oscillator means is activated in response to a binary logic signal supply voltage for the portable recording medium.

4. The reading and writing apparatus as set forth in claim 1, wherein said logic circuit means is an AND gate having a first input terminal connected to said clock oscillator means and a second input terminal connected to the external control unit.

5. The reading and writing apparatus as set forth in claim 4, wherein the second input terminal of said AND gate is responsive to a clock-enable binary logic signal supplied from the external control unit.

6. The reading and writing apparatus as set forth in claim 4, wherein the second input terminal of said AND gate is responsive to a binary logic signal supply voltage for the portable recording medium.

7. The reading and writing apparatus as set forth in claim 6, wherein the second input terminal of said AND gate is responsive to a binary logic signal voltage outputted from a monitor circuit when the binary logic signal supply voltage for the portable recording medium exceeds a predetermined level.

8. The reading and writing apparatus as set forth in claim 1, wherein said portable recording medium is an IC card.

9. A reading and writing apparatus for a portable recording medium, having a recording medium loading section and a contact section to connect external terminals of the loaded recording medium to an external control unit for controlling the recording medium, which comprises:
 (a) clock oscillator means for generating an operation clock to be supplied to the portable recording medium through the contact section; and
 (b) said clock oscillator means being activated in response to a binary logic signal supply voltage for the portable recording medium.

* * * * *